United States Patent
Piché et al.

(10) Patent No.: US 9,754,423 B2
(45) Date of Patent: *Sep. 5, 2017

(54) SYSTEM AND METHOD FOR RENDERING VIRTUAL CONTAMINANTS

(71) Applicant: CAE Inc., Saint-Laurent, QC (CA)

(72) Inventors: Patrick Piché, Saint-Eustache (CA); Bogdan Anghel, Pierrefonds (CA); Olivier Christin, Saint-Laurent (CA)

(73) Assignee: CAE INC., Saint-Laurent, QC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,246

(22) Filed: Oct. 24, 2016

(65) Prior Publication Data

US 2017/0039777 A1  Feb. 9, 2017

Related U.S. Application Data

(63) Continuation of application No. 14/228,480, filed on Mar. 28, 2014, now Pat. No. 9,483,847.

(51) Int. Cl.
| | |
|---|---|
| *G06T 15/00* | (2011.01) |
| *G06T 19/20* | (2011.01) |
| *G06T 11/00* | (2006.01) |
| *G06T 13/60* | (2011.01) |
| *G06T 11/60* | (2006.01) |
| *G06T 15/04* | (2011.01) |
| *G06T 17/20* | (2006.01) |

(52) U.S. Cl.
CPC ............ *G06T 19/20* (2013.01); *G06T 11/001* (2013.01); *G06T 11/60* (2013.01); *G06T 13/60* (2013.01); *G06T 15/00* (2013.01); *G06T 15/04* (2013.01); *G06T 17/20* (2013.01)

(58) Field of Classification Search
CPC ....................................................... G09B 9/05
See application file for complete search history.

(56) References Cited

U.S. PATENT DOCUMENTS

| | | |
|---|---|---|
| 5,363,483 A | 11/1994 | Jones et al. |
| 5,748,867 A | 5/1998 | Cosman et al. |
| 6,146,143 A | 11/2000 | Huston et al. |

(Continued)

OTHER PUBLICATIONS

Ohlson et al., "Real-time Rendering of Accumulated Snow", Uppsala University, extracted on Feb. 5, 2014, pp. 1-31.

*Primary Examiner* — Charles Tseng
(74) *Attorney, Agent, or Firm* — Gowling WLG Canada; Benoit Yelle

(57) ABSTRACT

Method and computer system for performing a computer simulation in which virtual contaminants are rendered on a scene thereof. A model defining a virtual environment of the computer simulation is loaded into memory module. The virtual environment defines a first additive zone and a second subtractive zone with vector paths therewithin and being at least partially enclosed within the first additive zone. An image generator module is used for adding a virtual contaminant over the first additive zone, removing, at least partially, the virtual contaminant within the second subtractive zone along the paths in 2D leaving a remaining virtual contaminant in the first additive zone and rendering an image for display comprising the remaining virtual contaminant in the virtual environment using a visual texture of the virtual contaminant. At least one border is defined along the paths for allowing smooth visual transition with one or more neighboring images.

24 Claims, 3 Drawing Sheets

(56) References Cited

U.S. PATENT DOCUMENTS

| | | |
|---|---|---|
| 6,639,591 B2 | 10/2003 | Shoji et al. |
| 6,747,649 B1 | 6/2004 | Sanz-Pastor et al. |
| 7,095,423 B2 | 8/2006 | Cosman et al. |
| 7,277,571 B2 | 10/2007 | Hara |
| 8,243,064 B1 | 8/2012 | Moravanszky et al. |
| 8,289,326 B2 | 10/2012 | Couvillion et al. |
| 8,793,105 B2 | 7/2014 | Poondru et al. |
| 2002/0032053 A1 | 3/2002 | Shoji et al. |
| 2006/0082576 A1 | 4/2006 | Gardiner et al. |
| 2006/0284889 A1 | 12/2006 | Cosman et al. |
| 2012/0253769 A1 | 10/2012 | Poondru et al. |
| 2012/0281002 A1 | 11/2012 | Ward et al. |

SYSTEM AND METHOD FOR RENDERING VIRTUAL CONTAMINANTS

PRIORITY STATEMENT

The present non-provisional patent application is a continuation patent application from U.S. patent application Ser. No. 14/228,480 filed on Mar. 28, 2014 in the name of CAE Inc., the content of which being incorporated herein by reference in its entirety.

TECHNICAL FIELD

The present invention relates to computer generated images and, more particularly, to generating images using a computer based on a modeled environment.

BACKGROUND

In computer simulation, an important aspect is to credibly replicate an actual environment where various conditions may be set and/or adjusted (e.g., atmospheric conditions, ground conditions, etc.). In order to remain credible, the rate of image generation in the computer simulation has to remain high enough to be seen as fluid from the user perspective. However, the computer generated images necessary for the computer simulation to be credible typically require a lot of material resources (e.g., processing power, memory and/storage space, etc.). Consequently, it is often necessary to let go of some level of environmental replication to remain within accessible material resources.

The present invention aims at improving the level of environmental replication while providing a solution that takes into consideration usage of the material resources.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention in accordance with a first set of embodiments is directed to a method for rendering virtual contaminants on a rendered scene in a computer simulation. The method comprises reading, by a processor, a model from a database, the model defining a virtual environment of the computer simulation. The virtual environment defines a plurality of zones comprising a first additive zone and a second subtractive zone. The second subtractive zone is at least partially enclosed within the first additive zone and the virtual environment defines paths within at least the second subtractive zone using vectors. The method also comprises adding, by an image generator module comprising one or more dedicated graphical processing units, a virtual contaminant over the first additive zone and removing by the one or more dedicated graphical processing units, at least partially, the virtual contaminant within the second subtractive zone leaving a remaining virtual contaminant in the first additive zone by extrusion in 2D along the paths. The paths define at least one border for allowing smooth visual transition with one or more images neighboring the paths. The method also comprises rendering by the one or more dedicated graphical processing units an image for display comprising the remaining virtual contaminant in the virtual environment using a visual texture of the virtual contaminant.

Optionally, the computer simulation may be a vehicle computer simulation and a field of view for rendering the image may be defined from a user's position within a simulated vehicle. The method may then further comprise receiving control command inputs from an input instrument simulation module, computing the control command inputs in accordance with rules of the computer simulation and, in response to the computing, modifying the field of view for rendering a subsequent image for display comprising the remaining virtual contaminant in the virtual environment. Optionally removing, at least partially, the virtual contaminant may be performed, during the computer simulation, before each time image rendering for display is performed. Adding the virtual contaminant may also optionally be performed, during the computer simulation, before each time removing, at least partially, the virtual contaminant is performed. Alternatively, adding the virtual contaminant may optionally be performed for the rendered scene at once, before rendering the image for display is performed during the computer simulation.

Optionally, adding the virtual contaminant and removing, at least partially, the virtual contaminant may be performed for the rendered scene at once, before rendering the image for display is performed during the computer simulation. The virtual environment may then define a plurality of additive polygons within the first additive zone and adding the virtual contaminant may then further comprise performing a maximum mathematical operation on the plurality of additive polygons to obtain a virtual contaminant image mask for the first additive zone. The plurality of additive polygons may optionally comprise linear polygons associated with a single pre-defined texture, tip polygons associated with two pre-defined textures and custom polygons associated with a plurality of arbitrary textures. The virtual environment may alternatively define a plurality of subtractive polygons within the second subtractive zone, and removing the virtual contaminant may then be performed, during the computer simulation, before each time image rendering for display is performed and the method may further comprise performing a minimum mathematical operation on the plurality of subtractive polygons to obtain the remaining virtual contaminant in the virtual contaminant image mask for the first additive zone. Rendering the image for display may optionally comprise rendering the remaining virtual contaminant in the virtual contaminant image mask by performing a multiply mathematical operation on the visual texture of the virtual contaminant and the virtual contaminant image mask. The visual texture of the virtual contaminant may be mapped onto the plurality of additive polygons.

A second aspect of the present invention in accordance with the first set of embodiments is directed to a computer system for performing a computer simulation in which virtual contaminants are rendered on a rendered scene of the computer simulation. The computer system comprises a memory module and an image generator module. The memory module is for loading thereinto a model defining a virtual environment of the computer simulation. The virtual environment defines a plurality of zones comprising a first additive zone and a second subtractive zone at least partially enclosed within the first additive zone. The virtual environment defines paths within at least the second subtractive zone using vectors. The image generator module is for adding a virtual contaminant over the first additive zone and removing, at least partially, the virtual contaminant within the second subtractive zone leaving a remaining virtual contaminant in the first additive zone by extrusion in 2D along the paths, the paths defining at least one border for allowing smooth visual transition with one or more images neighboring the paths. The image generator module is also for rendering an image for display comprising the remaining virtual contaminant in the virtual environment using a visual texture of the virtual contaminant.

Optionally, the computer simulation may be a vehicle computer simulation and a field of view for rendering the image may be defined from a user's position within a simulated vehicle. The computer system may then further comprise an input instrument simulation module for receiving control command inputs and a simulation computing module for computing the control command inputs in accordance with rules of the computer simulation. The image generator module, in response to the computing, may then further be for modifying the field of view for rendering a subsequent image for display comprising the remaining virtual contaminant in the virtual environment. The image generator module may further remove, at least partially, the virtual contaminant during the computer simulation, before each time image rendering for display is performed. The image generator module may also add the virtual contaminant during the computer simulation, before each time removing, at least partially, the virtual contaminant is performed.

The image generator module may alternatively also add the virtual contaminant for the rendered scene at once, before rendering the image for display is performed during the computer simulation. The image generator module may also optionally add the virtual contaminant and remove, at least partially, the virtual contaminant for the rendered scene at once, before rendering the image for display being performed during the computer simulation.

The virtual environment may optionally define a plurality of additive polygons within the first additive zone and the image generator module may then add the virtual contaminant by performing a maximum mathematical operation on the plurality of additive polygons to obtain a virtual contaminant image mask for the first additive zone. The plurality of additive polygons may further comprise linear polygons associated with a single pre-defined texture, tip polygons associated with two pre-defined textures and custom polygons associated with a plurality of arbitrary textures. The virtual environment may also optionally define a plurality of subtractive polygons within the second subtractive zone and the image generator module may then remove, during the computer simulation and before each time image rendering for display is performed, the virtual contaminant by performing a minimum mathematical operation on the plurality of subtractive polygons to obtain the remaining virtual contaminant in the virtual contaminant image mask for the first additive zone. The image generator module may also optionally render the image for display by rendering the remaining virtual contaminant in the virtual contaminant image mask by performing a multiply mathematical operation on the visual texture of the virtual contaminant and the virtual contaminant image mask. The visual texture of the virtual contaminant may be mapped onto the plurality of additive polygons by the image generator module.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
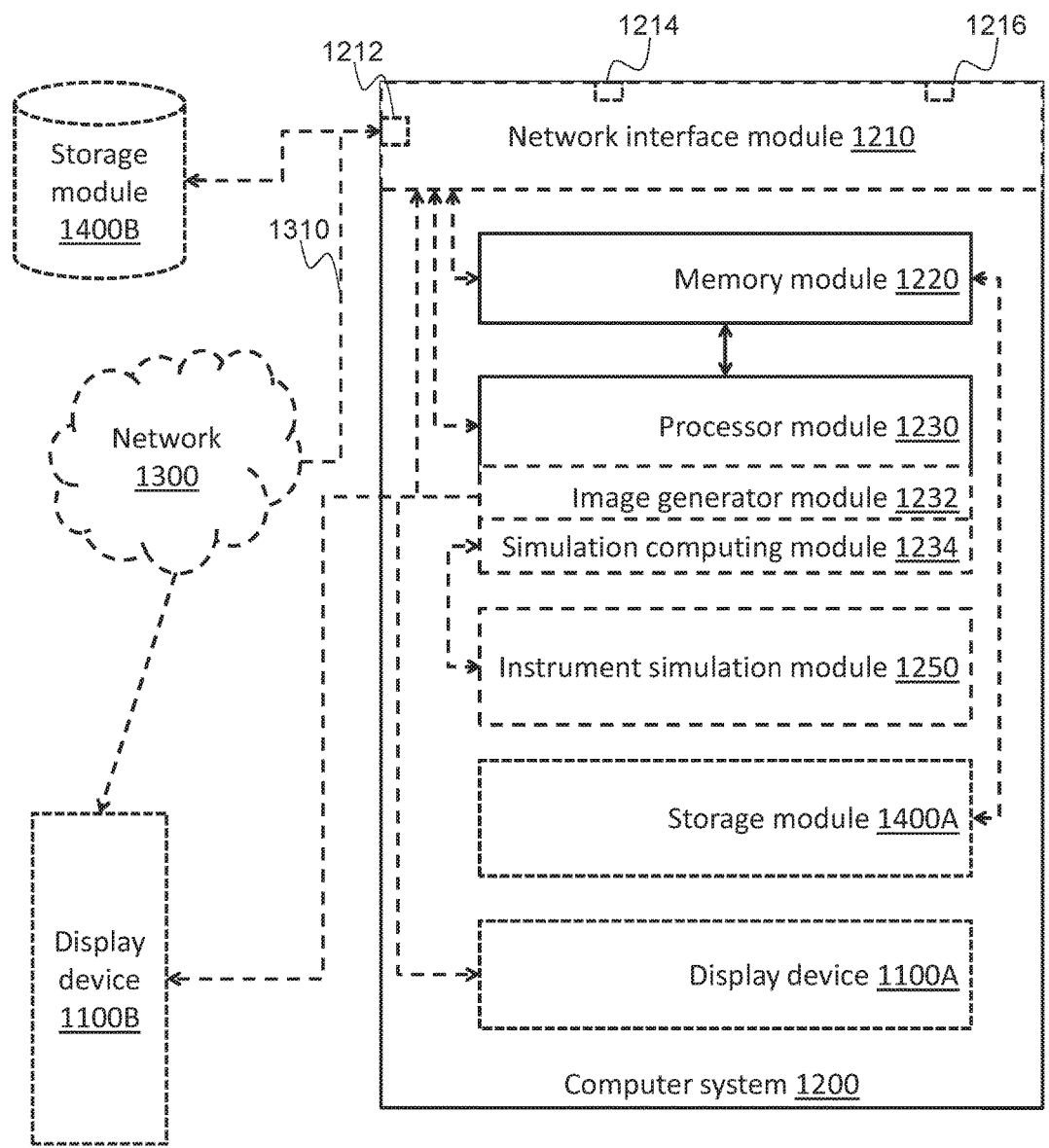
FIG. 1 is a logical representation of an exemplary computer system in accordance with the teachings of the present invention.

Reference is now made to the drawings in which FIG. 1 shows a logical representation of an exemplary computer system 1200 in accordance with the teachings of the present invention. FIG. 1 also shows a logical representation of an optional network 1300 that may be used in certain embodiments of the present invention. The computer system 1200 comprises a memory module 1220 and a processor module 1230. A display device is provided with the computer system 1100A and/or in communication with the computer system 1100B (both solutions being referred to as 1100). The display device 1100 may comprise at least one physical display unit, and may also comprise many display units of one or more technologies (e.g., Cathode Ray Tube (CRT), Liquid Crystal Display (LCD) screen or projector, any means to project the image onto a screen, mirror and/or display surface, etc.). A storage module is provided with the computer system 1400A and/or in communication with the computer system 1400B (both solutions being referred to in the description as 1400). The storage devices module 1400A and/or 1400B may represent one or more logical or physical as well as local or remote hard disk drive (HDD) (or an array thereof). The storage devices module 1400 may further represent a local or remote database made accessible to the computer system 1200 by a standardized or proprietary interface. The computer system 1200 may, in certain embodiments, comprise a network interface module 1210 and an instrument simulation module 1250. The processor module may further comprise, or may be seen logically as comprising, an image generator module 1232 and a simulation computing module 1234. The image generator module 1232 may also comprise one or more dedicated graphical processing units.

The network interface module 1210, e.g., through one or more of its interfaces (e.g., 1212, 1214, 1216), may be used in the context of the present invention to communicate through the network 1300 with the display device 1100B (e.g., display data over Ethernet) and/or with the storage module 1400B (e.g., to store and/or load a model of a computer simulation). The one or more interfaces may use different protocols and physical medium (e.g., local area network (LAN) over twisted pair cables, wireless LAN, wide area network (WAN) over cable, optical fiber, cellular, etc.), metropolitan area network MAN), etc.).

Virtual contaminants (or virtual contaminant) may represent snow on the ground, ice, dirt, water, mud, loose leafs, etc. The virtual contaminants may be defined as a 2D image in the 3D virtual environment, but may also represent a 3D shape having a 2D projected image in the 3D virtual environment.

The computer simulation may, for instance, be used for training purposes and/or for enacting a scenario from historical data (e.g. from an event recording device (e.g., black box) from an aircraft, a train, etc.). The computer simulation may be scenario-based (e.g., where simulation code driving the simulated environment comprises one or more predetermined events, motions, sounds, etc.).

The computer simulation may be a vehicle computer simulation and a field of view for rendering the image may be defined from a user's position within a simulated vehicle. The present invention is not limited by the type of simulated vehicle, which may be terrestrial (car, tank, etc.), underground, airborne (e.g., an aircraft, a space shuttle), floating (e.g., a boat), etc. The field of view, or point of view, may be defined from the position of a trainee of the simulated vehicle (e.g., interacting with the simulation) and/or the position of an operator of the simulated vehicle (e.g., only determining content of the simulation code or participating to the simulation as well).

In accordance with a first set of embodiments, the computer system 1200 performs a computer simulation in which virtual contaminants are rendered on a rendered scene of the computer simulation.

The memory module 1220 is for loading thereinto a model defining a virtual environment of the computer simulation. The virtual environment defines a plurality of zones comprising a first additive zone and a second subtractive zone. The second subtractive zone is at least partially enclosed within the first additive zone. The image generator module 1232 adds a virtual contaminant over the first additive zone and removes, at least partially, the virtual contaminant within the second subtractive zone leaving a remaining virtual contaminant in the first additive zone. The image generator module 1232 also renders an image for display comprising the remaining virtual contaminant in the virtual environment using a visual texture of the virtual contaminant.

In the context of the illustrated example, the computer system 1200 may further comprise an input instrument simulation module 1250 for receiving control command inputs (e.g., manipulations from the trainee and/or the operator). The instrument simulation module 1250 may comprise physical and/or logical representations of a simulated instrument module (simulated control panel or cockpit with logical and physical interfaces, etc.). The computer system 1200 may further comprise a simulation computing module 1234 for computing the control command inputs in accordance with rules of the computer simulation (or simulation code). The simulation computing module 1234 may be provided as a distinct module or as a portion, dedicated or not, of the processor module 1230 as exemplarily illustrated on FIG. 1. The image generator module 1232 may, in response to the computing performed by simulation computing module 1234 and/or the processor module 1230 more generally, further modify the field of view for rendering a subsequent image for display comprising the remaining virtual contaminant in the virtual environment.

The image generator module 1232 may remove, at least partially, the virtual contaminant during the computer simulation, before each time image rendering for display is performed. The image generator module 1232 may also add the virtual contaminant during the computer simulation, before each time removing, at least partially, the virtual contaminant is performed. Alternatively, the image generator module 1232 may add the virtual contaminant for the rendered scene at once, before rendering the image for display is performed during the computer simulation (the removal being performed at once or upon each rendering).

In another optional embodiment, the image generator module 1232 may add the virtual contaminant and may remove, at least partially, the virtual contaminant for the rendered scene at once, before rendering the image for display being performed during the computer simulation.

The virtual environment may further define a plurality of additive polygons within the first additive zone and the image generator module 1232 may then add the virtual contaminant by performing a maximum mathematical operation on the plurality of additive polygons to obtain a virtual contaminant image mask for the first additive zone. In the context of the present invention, polygons may be used to simplify image rendering by having a number of surfaces (typically triangles) representing the visible outer skin of a 3D or 2D shape (e.g., rather than by having a much higher number of individual points). The use of polygons may also simplify the environment modeling (as explained further below). Skilled persons will understand that other simplifications may be applied to image rendering and/or environment modeling (in addition to or in lieu of the polygons) in the context of the present invention.

The virtual environment may also define a plurality of subtractive polygons within the second subtractive zone and the image generator module 1232 may then remove the virtual contaminant by performing a minimum mathematical operation on the plurality of subtractive polygons to obtain the remaining virtual contaminant in the virtual contaminant image mask for the first additive zone. In one embodiment, the first additive zone and the second subtractive zone are both defined using polygons. In another embodiment, only the second subtractive zone is defined using polygons and the first additive zone is defined using another technique. The plurality of additive polygons may further comprises linear polygons associated with a single pre-defined texture, tip polygons associated with two pre-defined textures and custom polygons associated with a plurality of arbitrary textures.

The image generator module 1232 may further render the image for display by rendering the remaining virtual contaminant in the virtual contaminant image mask by performing a multiply mathematical operation on the visual texture of the virtual contaminant and the virtual contaminant image mask. The visual texture of the virtual contaminant may further be mapped onto the plurality of additive polygons.

In an optional embodiment, the virtual environment may define paths within at least the second subtractive zone using vectors and the image generator module 1232 may then remove the virtual contaminant by extrusion along the paths. The extrusion may be performed in 2D along the paths and the paths may further define at least one border for allowing smooth visual transition with one or more images neighboring the paths.

The solution described herein may be used for rendering a 2D image of the virtual contaminants in a 3D scene and may be extrapolated to rendering 3D shape (or a 2D projection of the 3D shape) representing the virtual contaminant in the 3D scene. In this 3D exemplary context, the extrusion may be performed along a 3D path (e.g., leaving a variable "depth" of the virtual contaminants along its width).

Figure 2:
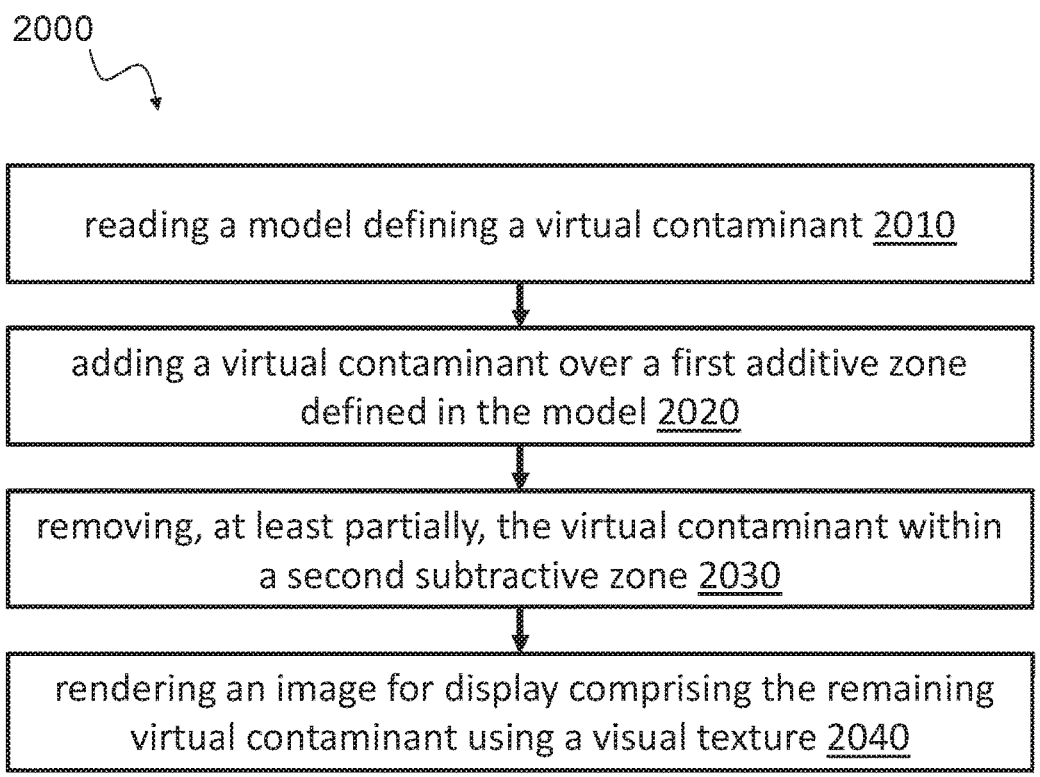
FIG. 2 is a flow chart of an exemplary rendering method in accordance with a first set of embodiments of the present invention.

FIG. 2 shows a flow chart of an exemplary a method 2000 for rendering virtual contaminants on a rendered scene in a computer simulation in accordance with the first set of embodiments exemplified above. The method 2000 comprises reading (2010) the model from a database (e.g., the storage module 1400) or otherwise loading the model, e.g., from the memory module 1220). As previously mentioned, the model defines a virtual environment of the computer simulation. The virtual environment defines a plurality of zones comprising a first additive zone and a second subtractive zone, the second subtractive zone being at least partially enclosed within the first additive zone. The method further comprises adding (2020) a virtual contaminant over the first additive zone, removing (2030), at least partially, the virtual contaminant within the second subtractive zone leaving a remaining virtual contaminant in the first additive zone and rendering (2040) an image for display comprising the remaining virtual contaminant in the virtual environment using a visual texture of the virtual contaminant.

The computer simulation may be a vehicle computer simulation and a field of view for rendering the image may be defined from a user's position within a simulated vehicle as exemplified above. In that context, the method may further comprise receiving control command inputs from an input instrument simulation module, computing the control command inputs in accordance with rules of the computer simulation and, in response to the computing, modifying the field of view for rendering a subsequent image for display comprising the remaining virtual contaminant in the virtual environment.

Removing, at least partially, the virtual contaminant may optionally be performed, during the computer simulation, before each time image rendering for display is performed. Adding the virtual contaminant may, as a complementary option, be performed, during the computer simulation, before each time removing, at least partially, the virtual contaminant is performed. Adding the virtual contaminant may alternatively be performed for the rendered scene at once, before rendering the image for display is performed during the computer simulation. Rendering the image for display may optionally be performed in an image generator module having one or more dedicated graphical processing units.

In another optional embodiment, adding the virtual contaminant and removing, at least partially, the virtual contaminant may be performed for the rendered scene at once, before rendering the image for display is performed during the computer simulation.

The virtual environment may further define a plurality of additive polygons within the first additive zone. Adding the virtual contaminant would then further comprise performing a maximum mathematical operation on the plurality of additive polygons to obtain a virtual contaminant image mask for the first additive zone. The virtual environment may also optionally define a plurality of subtractive polygons within the second subtractive zone. Removing the virtual contaminant would then further comprise performing a minimum mathematical operation on the plurality of subtractive polygons to obtain the remaining virtual contaminant in the virtual contaminant image mask for the first additive zone. Rendering the image for display may thus comprise rendering the remaining virtual contaminant in the virtual contaminant image mask by performing a multiply mathematical operation on the visual texture of the virtual contaminant and the virtual contaminant image mask. The visual texture of the virtual contaminant may further be mapped onto the plurality of additive polygons.

The plurality of additive polygons may further comprise linear polygons associated with a single pre-defined texture, tip polygons associated with two pre-defined textures and custom polygons associated with a plurality of arbitrary textures.

In an optional embodiment, the virtual environment may define paths within at least the second subtractive zone using vectors and removing the virtual contaminant may then be performed by extrusion along the paths. The extrusion may be performed in 2D along the paths and the paths may define at least one border for allowing smooth visual transition with one or more images neighboring the paths.

Reference is now made to FIG. 1 with particular reference to a second set of embodiments. In accordance with the second set of embodiments, the computer system 1200 is for modeling, in a virtual environment of a computer simulation, virtual contaminants in a scene to be rendered. In the context of the second set of embodiments, the computer system 1200, while it may be able to do so, is not expected to run the computer simulation itself or at least not run the computer simulation at full rate. In this exemplary context, the processing module 1230 is for, using a graphical user interface on the display device 1100, defining, in a model, a first additive zone of the scene over which a virtual contaminant is to be added and defining, in the model, a second subtractive zone of the scene over which the virtual contaminant is to be at least partially removed, the second subtractive zone being at least partially enclosed within the first additive zone. The memory module 1220 is for storing the model, the model being made available through the storage module 1400 for rendering the virtual contaminants on the scene in the computer simulation (e.g., in accordance with the first set of embodiments).

The processing module 1230 may further be for defining the first additive zone further by defining a plurality of additive polygons within the first additive zone to allow production of a virtual contaminant image mask for the first additive zone. The processing module 1230 may also further be for defining the second subtractive zone further by defining a plurality of subtractive polygons within the second subtractive zone to allow determination of a remaining virtual contaminant in the virtual contaminant image mask for the first additive zone and for associating a visual texture of the virtual contaminant outside the model. For instance, the visual texture of the virtual contaminant may be different at the time of image rendering and at the time of modeling (or may be absent at the time of modeling). The visual texture may thus be updated without changing the model. The determination of the remaining virtual contaminant may be performed, during the computer simulation, by an image generator module of another computer system (e.g., in accordance with the first set of embodiments) having predicted (or expected) processing capacities before each time image rendering for display is performed. As such, during the modeling, the polygons may be sized or otherwise defined in accordance with the predicted processing capacities of the image generator module. More generally, when polygons are not used, the first additive zone may be defined in accordance with the predicted processing capacities of the image generator module. As such, the computer simulation may be modeled considering that the image generator module having one or more dedicated graphical processing units will be rendering the scene images.

The plurality of additive polygons may comprise linear polygons associated, during the rendering, with a single pre-defined texture, tip polygons associated, during the computer simulation, with two pre-defined textures and custom polygons associated, at runtime, with a plurality of arbitrary textures. The plurality of subtractive polygons may also comprise linear polygons, tip polygons and custom polygons.

The processing module 1230 may also further be for defining the second subtractive zone further by defining paths within at least the second subtractive zone using vectors along which the virtual contaminant is to be removed (e.g., by extrusion). The extrusion may be performed in 2D or 3D along the paths and the processing module 1230 may further be for, in the model, defining at least one border along the paths for allowing smooth visual transition with one or more images neighboring the paths.

The computer simulation may be a vehicle computer simulation and a field of view for rendering the image is defined from a user's position within a simulated vehicle (as exemplified in the context of the first set of embodiments). The processing module may also further be for launching the computer simulation in a preview mode and, in the preview mode, for a single image and considering the field of view, adding a virtual contaminant over the first additive zone and removing, at least partially, the virtual contaminant within the second subtractive zone leaving a remaining virtual contaminant in the first additive zone. The processing module 1230 may also further be for, in the preview mode, rendering, at a rate lower than the expected rate of the computer simulation, images for display comprising the remaining virtual contaminant in the virtual environment using a visual texture of the virtual contaminant for display on the display device 1100.

During the preview mode, the same principal of rendering explained in the context of the first set of embodiments may be applied. More specifically, the virtual environment may further define a plurality of additive polygons within the first additive zone. The processing module 1230 may be further for adding the virtual contaminant further by performing a maximum mathematical operation on the plurality of additive polygons to obtain a virtual contaminant image mask for the first additive zone. The virtual environment may also define a plurality of subtractive polygons within the second subtractive zone and the processing module may then be further for removing the virtual contaminant further by performing a minimum mathematical operation on the plurality of subtractive polygons to obtain the remaining virtual contaminant in the virtual contaminant image mask for the first additive zone. The processing module 1230 may yet further be for rendering the image for display on the display device by rendering the remaining virtual contaminant in the virtual contaminant image mask by performing a multiply mathematical operation on the visual texture of the virtual contaminant and the virtual contaminant image mask.

Figure 3:
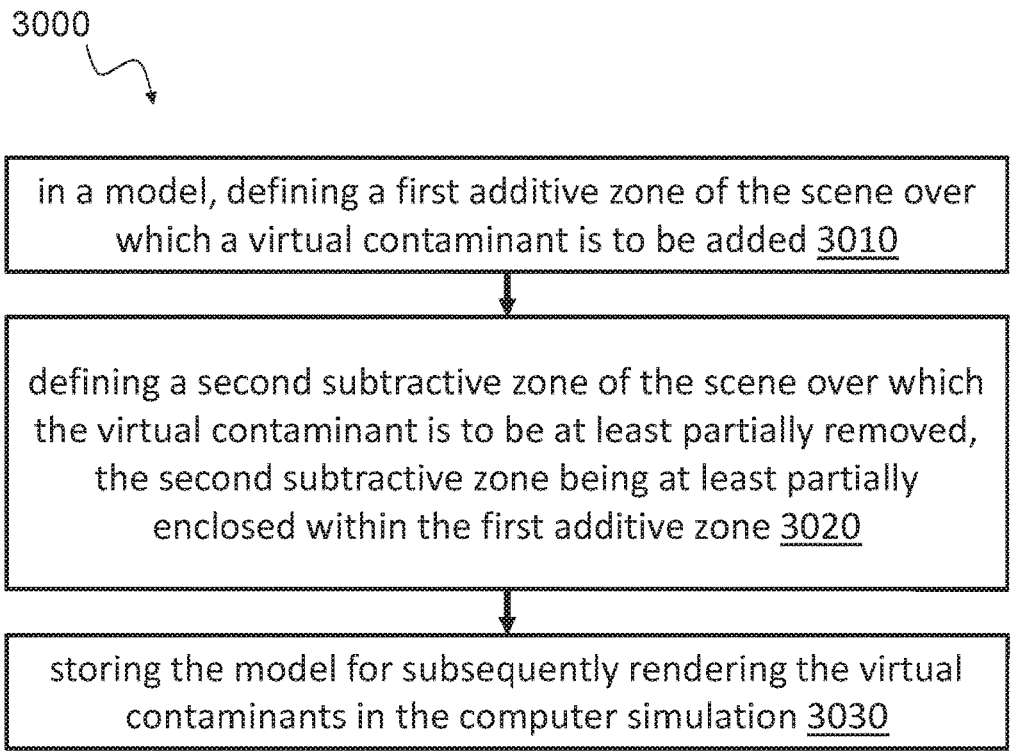
FIG. 3 is a flow chart of an exemplary modeling method in accordance with a second set of embodiments of the present invention.

FIG. 3 shows a method 3000, in accordance with the second set of embodiments, for modeling, in the virtual environment of the computer simulation, virtual contaminants in a scene to be rendered. The method 3000 comprises, in a model, defining (3010) a first additive zone of the scene over which a virtual contaminant is to be added, in the model, defining (3020) a second subtractive zone of the scene over which the virtual contaminant is to be at least partially removed, the second subtractive zone being at least partially enclosed within the first additive zone and storing (3030) the model into a memory module for subsequently rendering the virtual contaminants on the scene in the computer simulation.

In an optional embodiment, defining the first additive zone may further comprise defining a plurality of additive polygons within the first additive zone to allow production of a virtual contaminant image mask for the first additive zone. Defining the second subtractive zone may also further comprise defining a plurality of subtractive polygons within the second subtractive zone to allow determination of a remaining virtual contaminant in the virtual contaminant image mask for the first additive zone. The method may then further comprise associating a visual texture of the virtual contaminant outside the model. The determination of the remaining virtual contaminant may be performed, during the computer simulation, before each time image rendering for display is performed.

The plurality of additive polygons may comprise linear polygons associated, during the rendering, with a single pre-defined texture, tip polygons associated, during the computer simulation, with two pre-defined textures and custom polygons associated, at runtime, with a plurality of arbitrary textures. The plurality of subtractive polygons may also comprise linear polygons, tip polygons and custom polygons.

Optionally, defining the second subtractive zone may further comprise defining paths within at least the second subtractive zone using vectors along which the virtual contaminant is to be removed by extrusion. The extrusion may be performed in 2D along the paths and the method may further comprise, in the model, defining at least one border along the paths for allowing smooth visual transition with one or more images neighboring the paths.

The computer simulation may be modeled considering that an image generator module having one or more dedicated graphical processing units will be rendering the scene images.

The computer simulation may be a vehicle computer simulation and a field of view for rendering the image is defined from a user's position within a simulated vehicle. The method may then further comprise launching the computer simulation in a preview mode and, in the preview mode, for a single image and considering the field of view, adding a virtual contaminant over the first additive zone and removing, at least partially, the virtual contaminant within the second subtractive zone leaving a remaining virtual contaminant in the first additive zone. The method may also further comprise, in the preview mode, rendering, at a rate lower than the expected rate of the computer simulation, the single image for display comprising the remaining virtual contaminant in the virtual environment using a visual texture of the virtual contaminant for display on a display device. The virtual environment may define a plurality of additive polygons within the first additive zone and adding the virtual contaminant may then further comprise performing a maximum mathematical operation on the plurality of additive polygons to obtain a virtual contaminant image mask for the first additive zone. The virtual environment may also define a plurality of subtractive polygons within the second subtractive zone and removing the virtual contaminant may then further comprise performing a minimum mathematical operation on the plurality of subtractive polygons to obtain the remaining virtual contaminant in the virtual contaminant image mask for the first additive zone. Rendering the image for display may yet further comprise rendering the remaining virtual contaminant in the virtual contaminant image mask by performing a multiply mathematical operation on the visual texture of the virtual contaminant and the virtual contaminant image mask.

The processor module 1230 may represent a single processor with one or more processor cores or an array of processors, each comprising one or more processor cores. The memory module 1220 may comprise various types of memory (different standardized or kinds of Random Access Memory (RAM) modules, memory cards, Read-Only Memory (ROM) modules, programmable ROM, etc.). The network interface module 1210 represents at least one physical interface that can be used to communicate with other network nodes. The network interface module 1210 may be made visible to the other modules of the computer system 1200 through one or more logical interfaces. The actual stacks of protocols used by the physical network interface(s) and/or logical network interface(s) of the network interface module 1210 do not affect the teachings of the present invention. The variants of processor module 1230, memory module 1220, network interface module 1210 and storage devices module 1400 usable in the context of the present invention will be readily apparent to persons skilled in the art. Likewise, even though explicit mentions of the memory module 1220 and/or the processor module 1230 are not made throughout the description of the present examples, persons skilled in the art will readily recognize that such modules are used in conjunction with other modules of the computer system 1200 to perform routine as well as innovative steps related to the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for rendering virtual contaminants on a rendered scene in a computer simulation comprising:
   reading, by a processor, a model from a database, the model defining a virtual environment of the computer simulation, the virtual environment defining a plurality of zones comprising a first additive zone and a second subtractive zone, the second subtractive zone being at least partially enclosed within the first additive zone, the virtual environment defining paths within at least the second subtractive zone using vectors;
   adding, by an image generator module comprising one or more dedicated graphical processing units, a virtual contaminant over the first additive zone;
   removing by the one or more dedicated graphical processing units, at least partially, the virtual contaminant within the second subtractive zone leaving a remaining virtual contaminant in the first additive zone by extrusion in 2D along the paths, the paths defining at least one border for allowing smooth visual transition with one or more images neighboring the paths; and
   rendering by the one or more dedicated graphical processing units an image for display comprising the remaining virtual contaminant in the virtual environment using a visual texture of the virtual contaminant.

2. The method of claim 1, wherein the computer simulation is a vehicle computer simulation and a field of view for rendering the image is defined from a user's position within a simulated vehicle.

3. The method of claim 2, further comprising:
   receiving control command inputs from an input instrument simulation module;
   computing the control command inputs in accordance with rules of the computer simulation; and
   in response to the computing, modifying the field of view for rendering a subsequent image for display comprising the remaining virtual contaminant in the virtual environment.

4. The method of claim 3, wherein removing, at least partially, the virtual contaminant is performed, during the computer simulation, before each time image rendering for display is performed.

5. The method of claim 4, wherein adding the virtual contaminant is performed, during the computer simulation, before each time removing, at least partially, the virtual contaminant is performed.

6. The method of claim 4, wherein adding the virtual contaminant is performed for the rendered scene at once, before rendering the image for display is performed during the computer simulation.

7. The method of claim 1, wherein adding the virtual contaminant and removing, at least partially, the virtual contaminant are performed for the rendered scene at once, before rendering the image for display is performed during the computer simulation.

8. The method of claim 7, wherein the virtual environment defines a plurality of additive polygons within the first additive zone, wherein adding the virtual contaminant further comprises performing a maximum mathematical operation on the plurality of additive polygons to obtain a virtual contaminant image mask for the first additive zone.

9. The method of claim 8, wherein the plurality of additive polygons comprises linear polygons associated with a single pre-defined texture, tip polygons associated with two pre-defined textures and custom polygons associated with a plurality of arbitrary textures.

10. The method of claim 8, wherein the virtual environment defines a plurality of subtractive polygons within the second subtractive zone, wherein removing the virtual contaminant is performed, during the computer simulation, before each time image rendering for display is performed and further comprises performing a minimum mathematical operation on the plurality of subtractive polygons to obtain the remaining virtual contaminant in the virtual contaminant image mask for the first additive zone.

11. The method of claim 10, wherein rendering the image for display comprises rendering the remaining virtual contaminant in the virtual contaminant image mask by performing a multiply mathematical operation on the visual texture of the virtual contaminant and the virtual contaminant image mask.

12. The method of claim 10, wherein the visual texture of the virtual contaminant is mapped onto the plurality of additive polygons.

13. A computer system for performing a computer simulation in which virtual contaminants are rendered on a rendered scene of the computer simulation, the computer system comprising:
   a memory module for loading thereinto a model defining a virtual environment of the computer simulation, the virtual environment defining a plurality of zones comprising a first additive zone and a second subtractive zone, the second subtractive zone being at least partially enclosed within the first additive zone, the virtual environment defining paths within at least the second subtractive zone using vectors; and an image generator module for:
  adding a virtual contaminant over the first additive zone;
  removing, at least partially, the virtual contaminant within the second subtractive zone leaving a remaining virtual contaminant in the first additive zone by extrusion in 2D along the paths, the paths defining at least one border for allowing smooth visual transition with one or more images neighboring the paths; and
  rendering an image for display comprising the remaining virtual contaminant in the virtual environment using a visual texture of the virtual contaminant.

14. The computer system of claim 13, wherein the computer simulation is a vehicle computer simulation and a field of view for rendering the image is defined from a user's position within a simulated vehicle.

15. The computer system of claim 14, further comprising:
  an input instrument simulation module for receiving control command inputs;
  a simulation computing module for computing the control command inputs in accordance with rules of the computer simulation; and
  wherein the image generator module, in response to the computing, is further for modifying the field of view for rendering a subsequent image for display comprising the remaining virtual contaminant in the virtual environment.

16. The computer system of claim 15, wherein the image generator module removes, at least partially, the virtual contaminant during the computer simulation, before each time image rendering for display is performed.

17. The computer system of claim 16, wherein the image generator module adds the virtual contaminant during the computer simulation, before each time removing, at least partially, the virtual contaminant is performed.

18. The computer system of claim 15, wherein the image generator module adds the virtual contaminant for the rendered scene at once, before rendering the image for display is performed during the computer simulation.

19. The computer system of claim 13, wherein the image generator module adds the virtual contaminant and removes, at least partially, the virtual contaminant for the rendered scene at once, before rendering the image for display being performed during the computer simulation.

20. The computer system of claim 13, wherein the virtual environment defines a plurality of additive polygons within the first additive zone, wherein the image generator module adds the virtual contaminant by performing a maximum mathematical operation on the plurality of additive polygons to obtain a virtual contaminant image mask for the first additive zone.

21. The computer system of claim 20, wherein the plurality of additive polygons comprises linear polygons associated with a single pre-defined texture, tip polygons associated with two pre-defined textures and custom polygons associated with a plurality of arbitrary textures.

22. The computer system of claim 20, wherein the virtual environment defines a plurality of subtractive polygons within the second subtractive zone, wherein the image generator module removes, during the computer simulation and before each time image rendering for display is performed, the virtual contaminant by performing a minimum mathematical operation on the plurality of subtractive polygons to obtain the remaining virtual contaminant in the virtual contaminant image mask for the first additive zone.

23. The computer system of claim 22, wherein the image generator module renders the image for display by rendering the remaining virtual contaminant in the virtual contaminant image mask by performing a multiply mathematical operation on the visual texture of the virtual contaminant and the virtual contaminant image mask.

24. The computer system of claim 22, wherein the visual texture of the virtual contaminant is mapped onto the plurality of additive polygons by the image generator module.

* * * * *